(12) United States Patent
El Baradai et al.

(10) Patent No.: US 12,148,952 B2
(45) Date of Patent: Nov. 19, 2024

(54) MULTILAYER SEPARATOR INCLUDING POLYOLEFIN BASED SUBSTRATE LAYER STACKED WITH POLYOLEFIN RESIN LAYER AND CELLULOSE FIBERS BASED OUTER LAYER, AND LITHIUM ION BATTERY INCLUDING THE SAME

(71) Applicant: Renata AG, Itingen (CH)

(72) Inventors: Oussama El Baradai, Basel (CH); Pascal Haering, Muttenz (CH)

(73) Assignee: RENATA AG, Itingen (CH)

( * ) Notice: Subject to any disclaimer, the term of this patent is extended or adjusted under 35 U.S.C. 154(b) by 112 days.

(21) Appl. No.: 17/521,168

(22) Filed: Nov. 8, 2021

(65) Prior Publication Data

US 2022/0209363 A1 Jun. 30, 2022

(30) Foreign Application Priority Data

Dec. 29, 2020 (EP) .................. 20217473

(51) Int. Cl.
| | | |
|---|---|---|
| *H01M 50/457* | (2021.01) | |
| *H01M 10/0525* | (2010.01) | |
| *H01M 50/403* | (2021.01) | |
| *H01M 50/417* | (2021.01) | |
| *H01M 50/429* | (2021.01) | |
| *H01M 50/44* | (2021.01) | |

(52) U.S. Cl.
CPC ..... *H01M 50/457* (2021.01); *H01M 10/0525* (2013.01); *H01M 50/403* (2021.01); *H01M 50/417* (2021.01); *H01M 50/4295* (2021.01); *H01M 50/44* (2021.01)

(58) Field of Classification Search
CPC ........... H01M 50/457; H01M 50/4295; H01M 50/403; H01M 50/417; H01M 50/44
USPC ......................................... 429/144, 254, 255
See application file for complete search history.

(56) References Cited

U.S. PATENT DOCUMENTS

| | | | | |
|---|---|---|---|---|
| 6,080,507 A | * | 6/2000 | Yu ................. | H01M 50/491 |
| | | | | 429/62 |
| 10,586,967 B2 | | 3/2020 | Park et al. | |

(Continued)

FOREIGN PATENT DOCUMENTS

| | | | |
|---|---|---|---|
| CN | 105185939 A | * | 12/2015 |
| CN | 109935754 A | | 6/2019 |

(Continued)

OTHER PUBLICATIONS

"Cellulose acetate." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1231606. (Year: 2010).*

(Continued)

*Primary Examiner* — Sean P Cullen
(74) *Attorney, Agent, or Firm* — Sughrue Mion, PLLC

(57) ABSTRACT

A multilayer separator (200) for a lithium-ion battery having a structure including at least a polyolefin based substrate layer (204) forming the inner layer of the multilayer separator (200); a resin layer (203) stacked on both surface of the (Continued)

polyolefin substrate layer (204), the resin layer (203) being formed from a polyolefin; a cellulose fibers based outer layer (202) stacked on the surface of each resin layer (203).

16 Claims, 1 Drawing Sheet

(56) References Cited

U.S. PATENT DOCUMENTS

| | | |
|---|---|---|
| 2010/0316912 A1 | 12/2010 | Hashimoto et al. |
| 2012/0219864 A1* | 8/2012 | Ikoma ................. H01M 50/409 428/321.1 |
| 2014/0329127 A1* | 11/2014 | Ohashi ................ H01M 50/417 156/77 |
| 2015/0194655 A1* | 7/2015 | Toyoshima ........... H01M 4/485 429/246 |
| 2015/0333310 A1* | 11/2015 | Choi ................... H01M 50/451 429/145 |
| 2017/0098810 A1 | 4/2017 | Whear et al. |

FOREIGN PATENT DOCUMENTS

| | | | |
|---|---|---|---|
| EP | 2 408 043 A1 | 1/2012 | |
| JP | 11-329390 A | 11/1999 | |
| JP | 2010-287697 A | 12/2010 | |
| JP | 2011210680 A * | 10/2011 | |
| JP | 2014-167918 A | 9/2014 | |
| KR | 10-2016-0117315 A | 10/2016 | |
| KR | 10-2016-0133275 A | 11/2016 | |
| KR | 20160133275 A * | 11/2016 | .......... H01M 10/052 |

OTHER PUBLICATIONS

Schaschke, Carl. "acetate process." In a Dictionary of Chemical Engineering. : Oxford University Press, 2014. https://www.oxfordreference.com/view/10.1093/acref/9780199651450.001.0001/acref-9780199651450-e-28. (Year: 2014).*

"Cellulose ethanoate." In a Dictionary of Chemistry, edited by Law, Jonathan, and Richard Rennie. : Oxford University Press, 2020. https://www.oxfordreference.com/view/10.1093/acref/9780198841227.001.0001/acref-9780198841227-e-821. (Year: 2020).*

"Make." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1265484. (Year: 2010).*

Ming Xiong et al., "Ethylcellulose-coated polyolefin separators for lithium-ion batteries with improved safety performance", Carbohydrate Polymers, 2014, pp. 1140-1146, vol. 101.

The extended European search report of EP20217473.6 dated Jun. 14, 2021.

* cited by examiner

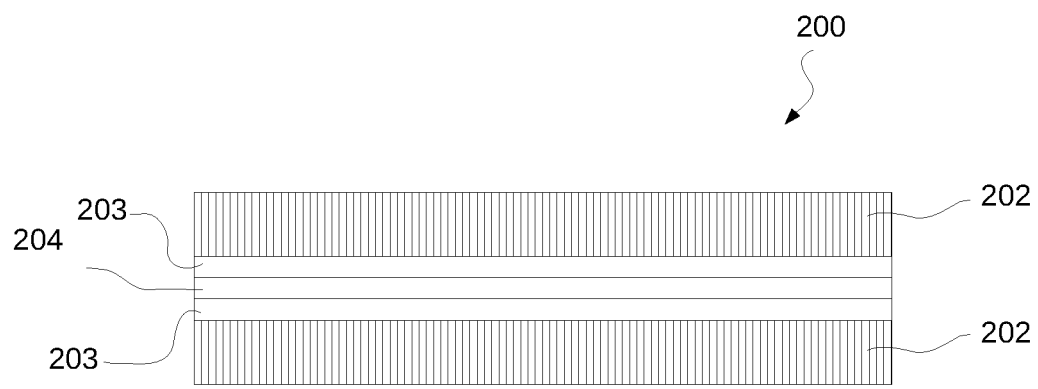

MULTILAYER SEPARATOR INCLUDING POLYOLEFIN BASED SUBSTRATE LAYER STACKED WITH POLYOLEFIN RESIN LAYER AND CELLULOSE FIBERS BASED OUTER LAYER, AND LITHIUM ION BATTERY INCLUDING THE SAME

CROSS REFERENCE TO RELATED APPLICATIONS

This application is claiming priority based on European Patent Application No. 20217473.6 filed on Dec. 29, 2020, the disclosure of which is incorporated herein in its entirely by reference.

FIELD OF THE INVENTION

The present invention relates to a multilayer ionic conductive separator for a battery and a method for manufacturing of such multilayer separator.

More specifically, the present invention concerns multilayer ionic conductive separator for a lithium-ion battery and a method for manufacturing of such separator.

BACKGROUND OF THE INVENTION

Lithium ion batteries have received in the last decades a growing attention as mature technology to replace fossil-based fuels and guarantee a sustainable clean energy source ensuring high energy density and long cycle life.

Among the components of a battery, the ionic conductive separator plays a capital role to avoid short circuit and to guarantee good functioning of the battery.

Indeed, the separator inserted between the two electrodes is electrically insulated and ionically conductive. Moreover, the separator has to maintain the aforementioned properties especially under hazardous conditions such as high temperatures.

Conventionally, the separators of lithium-ion batteries are made by a polyolefin layer such as polypropylene (PP) or polyethylene (PE) or a combination of these compounds.

In the art of battery design, it is well known that the using of polyolefin layer, as separator, ensure a shutdown effect at elevated temperature avoiding catastrophic thermal runaway. However, the wettability of this polyolefin layer is poor.

This property of wettability is much more critical and problematic for lithium-ion batteries where the liquid electrolyte is conventionally used to reliable cyclability.

The shrinking resistance of the separator are also weak due to the low melting down temperature of PE and PP, between 130° C. and 160° C., that exclude the use of such separators at elevated temperature.

In the last years, several efforts have been focused to overcome these limitations of poor wettability and high shrinkage of the polyolefin based separator without affecting the properties previously cited, and especially of shutdown effect.

"A low cost shutdown sandwich-like composite membrane with superior thermos-stability for lithium-ion battery", Li and al, Journal of Membrane Science 542, page 1-7, 2017, describes a porous polybenzimidazole (FBI) membrane as separator for lithium ion batteries having high thermal stability and electrolyte wettability. A conventional PE layer is immersed in FBI solution and dried in a vacuum oven at 70° C. for 24 hours. The obtained porous FBI membrane ensures high ionic conductivity, high thermal stability with no dimensional shrinkage up to 200° C. However, the preparation of the porous FBI membrane requires several long fabrication steps involving the use of organic chemistry, purification and precipitation processes that strongly affect the development and scalability of the process.

In order to promote the development of a low environmental impact chemistry, the document "Porous cellulose diacetate-SiO2 composite coating on polyethylene separator for high-performance lithium-ion battery", Chen et al, Carbohydrate Polymers 147 page 517-524, 2016, proposes a polyolefin separator comprising a PE layer coated with composite coating made by the combination of cellulose diacetate and $SiO_2$.

The weight ration of the SiO2 has a direct influence on the pores size of the composite separator. The amount of SiO2 has to be carefully tailored in order to avoid the formation of big pores sizes that could promote dendrite migration in the structure of the separator and results in battery failures.

The same approach has been followed in the document "Ethylcellulose-coated polyolefin separators for lithium-ion batteries with improved safety performance", Xiong and al, Carbohydrate Polymers 101, page 1140-1146, 2014. This document proposes a solution to considerably improve the wettability, the cyclability and the thermal shrinkage resistance of a polyolefin-based separator thanks to the coating of an ethylcellulose layer.

However, the pore size dimension of the coated layer as proposed is about 3 μm, still far from the sub-micrometric requirements for ionic conductive separators in lithium ion batteries field.

US 20140335424 discloses a separator for secondary battery including cellulose nanofibers. The separator as a porous structure of micropores formed between the cellulose nanofibers. The use of cellulose nanofibers enhance the wettability and the thermal stability of the separators compared with the conventional polyolefin based separator. However, the porous structure has a porosity that may reach 80% and the pores size until 10 μm. Once again, these values are not in line with the requirements of lithium ion batteries, and such solutions are not directly applicable to the lithium ion batteries.

US 20180013117 relates to a separator for a secondary battery, which is capable of improving a shutdown function of a cellulose based multilayer separator. The multilayer separator comprises a substrate formed of cellulose-based nanofibers and polyethylene nanoparticles, and a resin layer stacked on one surface of both surfaces of the substrate, the resin being formed from a polyolefin. The using of nanofibers having nanometric sizes "close" the pore structure of the separator and reduce dendrite penetration. However, the covering with a polyolefin resin of the nanocellulose substrate surfaces reduces the electrolyte retention and does not ensure a centered pores size distribution as in case of a membrane based separator, as for example the porous PBI membrane.

On the above background, one objective of the invention at hand is to at least alleviate above-identified and other drawbacks associated with the current art.

SUMMARY OF THE INVENTION

The above stated objective is achieved by means of the multilayer separator for a lithium-ion battery and a method for manufacturing of such a multilayer separator according to the independent claims, and by the embodiments according to the dependent claims.

More specifically, the first aspect of the present invention is directed at a multilayer separator for a lithium-ion battery having a structure comprising at least a polyolefin based substrate layer forming the inner layer of the multilayer separator, a resin layer stacked on both surface of the polyolefin substrate layer, the resin layer being formed from a polyolefin, a cellulose fibers based outer layer stacked on the surface of each resin layer.

The multilayer separator according to the invention including cellulose layers as outermost layers of the multilayer structure increase the thermal stability and provide higher electrolyte retention.

Preferably, the polyolefin based substrate layer is made of at least one selected group consisting of polyethylene, polypropylene, or a blend comprising substantially polypropylene or polyethylene.

Preferably, the polyolefin based substrate layer is made of low-density polyethylene (LPDE), linear low-density polyethylene (LLDPE), or a blend comprising substantially LPDE, LLDPE or a mixture thereof.

Preferably, the polyolefin based substrate layer is made of a random copolymer of ethylene and alpha-olefins selected from the group consisting of alpha-olefins having a polymerized alpha olefin content about 20% by weight, and preferably 16% by weight.

Preferably, the resin layer is made of at least one selected group consisting of polyethylene, polypropylene, or a blend comprising substantially polypropylene or polyethylene.

Preferably, the cellulose fibers based outer layer is made of at least one selected group consisting of consisting of ethyl cellulose, methyl cellulose, hydroxypropyl cellulose, hydroxyethyl cellulose, hydroxypropyl methyl cellulose, hydroxyethyl methyl cellulose, carboxymethyl cellulose, cellulose acetate, cellulose triacetate, cellulose acetate phthalate, nitrocellulose, cellulose acetate butylate, cellulose acetate propionate, ammonium thereof, and salt thereof.

Preferably, the cellulose fibers of the cellulose fibers based outer layer are refined cellulose fibers, cellulose microfibrils, cellulose nanofibrils, lignin and derivatives thereof.

Preferably, the cellulose fibers based outer layer has size of fibers comprised between 2 mm and 100 nm in length.

Preferably, the cellulose fibers of the cellulose fibers based outer layer are refined cellulose fibers having a size of 200 nm in length.

Preferably, the polyolefin based substrate layer has a thickness of 5 to 15 µm, the resin layer has a thickness of 12 to 75 µm, preferably 25 µm, and the cellulose fibers based outer layer has a thickness of 1 to 5 µm, preferably 2 µm.

Preferably, the polyolefin based substrate layer has a melting point of 80 to 124° C. and the resin layer has a melting point of 130 to 160° C.

Preferably, the resin layer is stacked in lamination method, a hydraulic pressure method or a filtration method.

Preferably, the cellulose fibers based outer layer is stacked in lamination method, a hydraulic pressure method, a filtration method or a slot dye coating method.

Furthermore, the second aspect of the present invention is a lithium-ion battery comprising a multilayer separator according to the invention.

Furthermore, the third aspect of the present invention is directed at a method for manufacturing a multilayer separator for a lithium-ion battery, said method comprising the followings steps:
1. a step of forming a polyolefin based substrate layer; p
2. a step of stacking a resin layer formed from a polyolefin on both surface of the polyolefin substrate layer formed in the precedent step, in a lamination method, a hydraulic pressure, or filtration method;
3. a step of stacking a cellulose fibers based outer layer on the surface of each resin layer in a lamination method, a hydraulic pressure, filtration method or slot dye coating method.

Preferably, the step of forming a polyolefin based substrate layer comprises:
4. a sub-step of forming a mixture of a linear low-density polyethylene compounded with calcium carbonate particles;
5. a sub-step of extruding said mixture into precursor film;
6. a sub-step of cooling and of stressing said precursor film in order to obtain said polyolefin based substrate layer.

Preferably, the mixture comprises, expressed in weight, between 40% and 45% of linear low-density polyethylene and 50% of calcium carbonate.

Preferably, the step of stacking a cellulose fibers based outer layer is a step of stacking a nano-fibrillated cellulose layer on the surface of each resin layer.

Further advantages and features of embodiments will become apparent when reading the following detailed description in conjunction with the drawings.

BRIEF DESCRIPTION OF THE DRAWINGS

The present invention will be described subsequently in more detail with reference to the attached drawing, given by way of examples, but in no way limited thereto, in which:

The FIGURE is a cross-sectional view of a multilayer separator for a lithium-ion battery in accordance with one embodiment of the present invention.

DETAILED DESCRIPTION OF THE INVENTION

The FIGURE is a cross-sectional view of a multilayer separator 10 for a lithium-ion battery in accordance with one embodiment of the present invention.

The multilayer separator 200 is an ionic conductive separator able to be inserted between the two electrodes of the lithium-ion battery in order to ensure an electrical insulating and an ionic conduction.

The multilayer separator 200 of the invention presents a structure comprising:
a polyolefin based substrate layer 204 forming the inner layer of the multilayer structure,
a resin layer 203 stacked on both surface of the polyolefin substrate layer 204, the resin layer 203 being formed from a polyolefin,
a cellulose fibers based outer layer 202 stacked on the surface of each resin layer 203.

Thus, the multilayer separator 200 of the invention presents a structure comprising two cellulose fibers based outer layers 202 and three polyolefin based inner layers 203, 204, 203 sandwiched between the two cellulose fibers based outer layers 202.

The polyolefin based substrate layer 204 provides shutdown effect and may be at least one selected group consisting of polyethylene, polypropylene, or a blend comprising substantially polypropylene or polyethylene.

Preferably, to achieve lower shutdown temperatures, the polyolefin based substrate layer 204 may be low-density polyethylene (LPDE), linear low-density polyethylene (LLDPE), or a blend comprising substantially LPDE, LLDPE or a mixture thereof.

Preferably, the polyolefin based substrate layer 204 may be at least one selected group consisting of a random copolymer of ethylene and alpha-olefins selected from the group consisting of alpha-olefins having a polymerized alpha olefin content about 20% by weight, and preferably 16% by weight.

Preferably, the polyolefin based substrate layer 204 may be include copolymers of ethylene-butene and copolymers of ethylene-hexene.

Preferably, the polyolefin based substrate layer 204 has a melting point of 80 to 124° C.

The polyolefin based resin layer 203 provides higher mechanical properties (higher puncture strength) and the may be at least one selected group consisting of polyethylene, polypropylene, or a blend comprising substantially polypropylene or polyethylene.

Preferably, the polyethylene may be low-density polyethylene (LDPE), linear low-density polyethylene (LLDPE), or a blend comprising substantially LPDE, LLDPE or a mixture thereof.

Preferably, the polyolefin based resin layer 203 has a melting point of 130 to 160° C.

The thickness of the resin layer 203 may be 12 to 75 μm and the thickness of the polyolefin substrate layer 204 may be 5 to 15 μm.

Preferably, the polyolefin based substrate layer 204 is polyethylene and the polyolefin based resin layer 203 is polypropylene.

The resin layer 203 may be prepared in the form of film, and may be stacked on both surfaces of the polyolefin based substrate layer 204 in a lamination method. In the case of a general coating method, a polymeric resin is melted in a solvent and then applied, but this method has problems of long processing time and low productivity. Since the resin layer according to the invention is prepared in the form of film and stacked in a lamination method, there is no need of use a solvent, thus simplifying the preparation process.

Further, since the resin layer 203 is prepared separately, characteristics such as the thickness, porosity, composition and the like of the resin layer can be adjusted easily.

In a another embodiment, the resin layer 203 may be prepared in the form of film, and may be stacked on both surfaces of the polyolefin based substrate layer 204 in a hydraulic pressure method or a filtration method.

The outer layers 202 consist of cellulose fibers made from group consisting of ethyl cellulose, methyl cellulose, hydroxypropyl cellulose, hydroxyethyl cellulose, hydroxypropyl methyl cellulose, hydroxyethyl methyl cellulose, carboxymethyl cellulose, cellulose acetate, cellulose triacetate, cellulose acetate phthalate, nitrocellulose, cellulose acetate butylate, cellulose acetate propionate, ammonium thereof, and salt thereof.

Cellulose fibers are preferably refined cellulose fibers, cellulose microfibrils, cellulose nanofibrils, lignin and derivatives thereof.

The Cellulose Fibers

The cellulose fibers of the of the outer layer 202 have size inferior or equal to 2 mm, in length.

Preferably, the cellulose fibers have size comprised between about 2 mm in length and about 100 nm in order to avoid the dendrite migration in the structure of the separator.

Preferably, cellulose fibers of the outer layer 202 are refined cellulose fibers, or cellulose nanofibrils, having a size of about 200 nm in length.

The cellulose fibers based outer layer 202 may be prepared separately, and may be stacked on the outer surface of each resin layer 203 in a lamination method, a hydraulic pressure, filtration method or slot die coating method.

According to one embodiment of the invention, the refined cellulose fibers (FBr) of the cellulose fibers based outer layer 202 can be obtained by a refining method comprising the following steps:
  a) a step of dispersion, in an aqueous medium, of previously dried cellulose fibers, to obtain a cellulose fiber paste in which the cellulose fiber content varies from 1 to 15% by weight relative to the total weight of said cellulose fiber paste;
  b) a step of shearing of said cellulose fiber paste, so as to obtain refined cellulose fibers, that is to say cellulose fibers exhibiting a Schopper-Riegler degree varying from 30 to 95° SR approximately.

As in the field of the paper industry, the refining method according to the present invention is a mechanical treatment of the cellulose fibers in order to obtain their hydration (step a) their fibrillation and their shortening as well as the creation of thin elements (step b).

The cellulose fibers based outer layer 202 according to the invention ensure greater electrolyte retention and thermal stability, while the polyolefin based resin layers 203 ensure higher puncture strength and the narrow pore size distribution fundamental to limit dendrite penetration in the separator (especially inside the polyolefin based substrate layer 204), and to avoid short circuit of the battery.

The higher puncture strength of resin layer 203 reduces risks of separator damaging in case of dendrite growing. The using of the polyolefin based resin layers 203 on each side of the polyolefin based substrate layer 204 allows considerably reducing the risk of failure.

Thanks to the multilayer separator 200 of the invention, the advantages of cellulose and polyolefin based materials are combined together to provide a multilayer separator, comprising the following material structure: cellulose material/polyolefin material/cellulose material, displaying high thermal stability, reduced shrinkage, high electrolyte retention and shutdown effect.

The multilayer separator 200 of the invention can be prepared according to manufacturing example shown hereinafter, but this example is no limitation thereto.

A linear low-density polyethylene (LLDPE) with a melt flow index of 2.0 was compounded with calcium carbonate particles that are surface-treated with calcium stearate. The calcium carbonate has an average particle size of 1 μm. Polymer compositions having LLPDE filled with 40%, 45%, and 50% by weight of CaCO respectively were then cast extruded into precursor films, each having a thickness of approximately 25 μm. Each resulting precursor film was cooled and subjected to tenter stress in the transverse direction with a stretch ratio of 2.5 to 1.

One layer of the resulting white porous film, forming the polyolefin based substrate layer 204 was then sandwiched between two stretched polypropylene (PP) microporous membranes, forming resin layer 203, and bonded together to form a trilayer structure PP/PE/PP forming the polyolefin based inner layers 203, 204, 203. Finally, the trilayer structure was coated by a slot dye technique with a nanofibrillated cellulose (NFC) layer exhibiting a thickness of 2 μm from both side of the trilayer structure and dried over night at 80° C. Once dried the multilayer separator according to the invention has the following structure:

NFC/PP/PE/PP/NFC.

In the drawings and the description, there have been disclosed typical preferred embodiments of the invention and, although specific terms are employed, they are used in a generic and descriptive sense only and not for purposes of limitation, the scope of the invention being set forth in the following claims.

The invention claimed is:

1. A multilayer separator (200) for a lithium-ion battery having a structure comprising at least:
   a polyolefin based substrate layer (204) forming an inner layer of the multilayer separator (200);
   a first resin layer (203) stacked on a first surface of the polyolefin based substrate layer (204) and a second resin layer (203) stacked on a second surface of the polyolefin based substrate layer (204), the resin layer (203) being formed from a polyolefin;
   a first cellulose fibers based outer layer (202) stacked on a surface of the first resin layer (203), and a second cellulose fibers based outer layer (202) stacked on a surface of the second resin layer (203),
   wherein said polyolefin based substrate layer (204) comprises polypropylene or a blend comprising polypropylene and polyethylene,
   wherein the first polyolefin based resin layer (203) and the second polyolefin based resin layer (203) comprise at least one selected from the group consisting of polyethylene, and a blend comprising polypropylene and polyethylene,
   wherein the first cellulose fibers based outer layer (202) and the second cellulose fibers based outer layer (202) comprise at least one selected from the group consisting of ethyl cellulose, methyl cellulose, hydroxypropyl cellulose, hydroxyethyl cellulose, hydroxypropyl methyl cellulose, hydroxyethyl methyl cellulose, carboxymethyl cellulose, cellulose acetate, cellulose triacetate, cellulose acetate phthalate, nitrocellulose, cellulose acetate butylate, cellulose acetate propionate, ammonium thereof, and salt thereof,
   wherein said polyolefin based substrate layer (204) comprises a random copolymer of ethylene and alpha-olefins selected from the group consisting of alpha-olefins having a polymerized alpha olefin content about 20% by weight,
   wherein the polyolefin based substrate layer (204) has a melting point of 80 to 124° C. and each of the first resin layer (203) and the second resin layer (203) has a melting point of 130 to 160° C., and
   wherein the polyolefin based substrate layer (204) has a thickness of 5 to 15 μm, each of the first resin layer (203) and the second resin layer (203) has a thickness of 12 to 75 μm and the cellulose fibers based outer layer (202) has a thickness of 1 to 5 μm.

2. The multilayer separator (200) for a lithium-ion battery according to claim 1, wherein said cellulose fibers of the first cellulose fibers based outer layer (202) and the second cellulose fibers based outer layer (202) are refined cellulose fibers, cellulose microfibrils, cellulose nanofibrils, lignin and derivatives thereof.

3. The multilayer separator (200) for a lithium-ion battery according to claim 1, wherein each of the first cellulose fibers based outer layer (202) and the second cellulose fibers based outer layer (202) has size of fibers comprised between 2 mm and 100 nm in length.

4. The multilayer separator (200) for a lithium-ion battery according to claim 1, wherein said cellulose fibers of the first cellulose fibers based outer layer (202) and the second cellulose fibers based outer layer (202) are refined cellulose fibers having a size of 200 nm in length.

5. The multilayer separator (200) for a lithium-ion battery according to claim 1, wherein each of the first cellulose fibers based outer layer (202) and the second cellulose fibers based outer layer (202) is stacked in lamination method, a hydraulic pressure method, a filtration method or slot dye coating method.

6. The multilayer separator (200) for a lithium-ion battery according to claim 1, wherein the first cellulose fibers based outer layer (202) and the second cellulose fibers based outer layer (202) comprise ethyl cellulose.

7. The multilayer separator (200) for a lithium-ion battery according to claim 1, wherein the first cellulose fibers based outer layer (202) and the second cellulose fibers based outer layer (202) comprise hydroxypropyl cellulose.

8. The multilayer separator (200) for a lithium-ion battery according to claim 1, wherein the first cellulose fibers based outer layer (202) and the second cellulose fibers based outer layer (202) comprise hydroxyethyl methyl cellulose.

9. The multilayer separator (200) for a lithium-ion battery according to claim 1, wherein the first cellulose fibers based outer layer (202) and the second cellulose fibers based outer layer (202) comprise cellulose acetate butylate.

10. The multilayer separator (200) for a lithium-ion battery according to claim 1, wherein the first cellulose fibers based outer layer (202) and the second cellulose fibers based outer layer (202) comprise cellulose acetate propionate.

11. The multilayer separator (200) for a lithium-ion battery according to claim 1, wherein each of the first resin layer (203) and the second resin layer (203) is stacked in lamination method, a hydraulic pressure method or a filtration method.

12. A lithium-ion battery wherein said lithium-ion battery comprises a multilayer separator (200) for a lithium-ion battery according to claim 1.

13. A method of preparing a multilayer separator (200) for lithium-ion battery according to claim 1, said method comprising:
   a step of forming the polyolefin based substrate layer (204);
   a step of stacking the first resin layer (203) on the first surface of the polyolefin based substrate layer (204) and the second resin layer (203) on the second surface of the polyolefin based substrate (204) in a lamination method, a hydraulic pressure, or filtration method;
   a step of stacking the first cellulose fibers based outer layer (202) on the surface of the first resin layer (203) and the second cellulose fibers based outer layer (202) on the surface of the second resin layer (203) in a lamination method, a hydraulic pressure, filtration method or slot dye coating method.

14. The method of preparing a multilayer separator (200) for lithium-ion battery according to claim 13, wherein said step of stacking a cellulose fibers based outer layer (202) is a step of stacking a nano-fibrillated cellulose layer on the surface of each resin layer (203).

15. The method of preparing a multilayer separator (200) for lithium-ion battery according to claim 13, wherein the step of forming the polyolefin based substrate layer (204) comprises:
   a sub-step of forming a mixture of a linear low-density polyethylene compounded with calcium carbonate particles;
   a sub-step of extruding said mixture into precursor film;
   a sub-step of cooling and of stressing said precursor film in order to obtain said polyolefin based substrate layer (204).

16. The method of preparing a multilayer separator (200) for lithium-ion battery according to claim 15, wherein the mixture comprises, expressed in weight, between 40% and 45% of linear low-density polyethylene and 50% of calcium carbonate.

* * * * *